United States Patent [19]
Fowler et al.

[11] 3,756,543
[45] Sept. 4, 1973

[54] LOAD STABILITY SYSTEM

[75] Inventors: Donald W. Fowler, West Haven; Sean J. O'Connor, Monroe, both of Conn.

[73] Assignee: United Aircraft Corporation, East Hartford, Conn.

[22] Filed: Aug. 5, 1971

[21] Appl. No.: 169,197

[52] U.S. Cl. ............................ 244/77 D, 244/17.13
[51] Int. Cl. ...................... B64c 11/44, B64c 27/70
[58] Field of Search ...................... 244/17.13, 77 R, 244/77 DZ, 137 R

[56] References Cited
UNITED STATES PATENTS

| | | | |
|---|---|---|---|
| 2,873,075 | 2/1959 | Mooers et al. | 244/17.13 |
| 2,998,210 | 8/1961 | Carter, Jr. | 244/77 D |
| 3,211,121 | 10/1965 | Dozier | 244/17.13 X |
| 3,055,214 | 9/1962 | McLane | 244/77 D X |
| 3,240,447 | 3/1966 | Olshavsen | 244/77 D |

*Primary Examiner*—Milton Buchler
*Assistant Examiner*—Stephen G. Kunin
*Attorney*—Melvin Pearson Williams

[57] ABSTRACT

A heavy lift helicopter supporting a load suspended on a long cable is automatically controlled to minimize pendular motion of the load beneath the helicopter. The inner control loop of an automatic flight control system of a helicopter has an additional input which is the summation of a function of the rate of change of the angle between the cable and vertical, and the lag filtered rate of change of the angle, in both the lateral (roll) and longitudinal (pitch) directions of the aircraft. The sense of the rate of lag rate inputs is such as to cause the helicopter to move so as to counteract pendular motion of the load and support cable.

6 Claims, 5 Drawing Figures

LOAD STABILITY SYSTEM

BACKGROUND OF THE INVENTION

1. Field of Invention

This invention relates to aircraft control systems, and more particularly to an automatic load stabilization system for a cable supported load.

2. Description of the Prior Art

The heavy lift helicopter is gaining acceptance as a means of moving relatively large and heavy objects which are suspended therebeneath. Such a helicopter acts as a moveable crane in the sky. Typical examples of such use include the loading and unloading of ships, offshore oil operations, the building of sky scrapers, transmission line construction, assemblage of modular apartment buildings, and transporting miscellaneous material over untravelable terrain. In military usage, loads are carried over enemy territory, and over jungle, swamps, and other impassable terrain; also, armament may be moved very swiftly toward a battelfront thereby enhancing military logistics.

It is imperative that the helicopter not be rendered significantly unstable while in flight since its ability to remain aloft might thereby be impaired. Therefore, the effect which the load has upon the helicopter has to be predictable, rather constant as a function of time, and within the aerodynamic limits of the helicopter. Hopefully, the load should exert little more than a downward gravitational pull on the aircraft.

In accepted techniques for utilizing a heavy lift helicopter as a crane, a support cable extends from a winch, and the helicopter is caused to hover with substantially no motion or acceleration in any direction, while the cable is lowered and attached to the load, and the load is thereafter winched straight up to the helicopter. In this fashion, the load is carried very close to the helicopter so that the two exhibit mechanical properties of substantially a unitary body. However, this type of maneuvering is very difficult (if not impossible) to achieve under instrument flying conditions, where the visibility is very poor, or in high winds. As an example, consider the lifting of a heavy object out of the hold of a ship. The object may be stabilized and guided from the ship until it clears the ship, provided the helicopter can be maintained in a relatively stable position. However, maneuvering of the helicopter so as to maintain its attitude naturally adjusts its position, and vice versa, which tends to affect the direction of pull by the support cable on the load. This effect can be minimized by using a relatively long cable. On the other hand, once the load clears the ship, it is then free to swing until such time as it has been winched into contact (or nearly so) with the helicopter. But if the cable is long, the load may begin to swing, with a pendular motion, even while it is on the way up and while it might still come into contact with the super-structure of the ship. On the other hand, if a short cable is used, the removal of the load from within the ship is very difficult even though it may quickly be winched to the helicopter once it is clear of the hold.

Depending upon weather conditions and the flight maneuvering which is required, it may be dangerous to have a load winched directly to the bottom of a helicopter. That is, the dynamic motion of the helicopter may result in the load literally colliding with the helicopter.

Therefore, more recently developed techniques utilize a very long cable with the load suspended therefrom. In some crane type aircraft known to the art, the helicopter is controlled by a second pilot sitting in an aft seat facing the winch where he can observe the load; in all aircraft, the pilot maneuvers the aircraft so as to stabilize the load. Under manual control, load-supporting helicopters are limited in speed, and suffer reduced maneuverability.

SUMMARY OF INVENTION

The object of the present invention is to provide load stabilization for a load suspended below an aircraft on a load support cable.

According to the present invention, pendular motion of load suspended on a cable below an aircraft is corrected by causing the aircraft to move in a direction related to functions of the rate of change of angle of the support cable with respect to the vertical. In accordance with the invention in one form, the functions of the angle rate approximates, on a short term basis, the angle minus the rate of change of the angle.

In further accord with the present invention, the afore-mentioned stabilization is achieved utilizing the summation of the rate of change of cable angle and the lag of the rate of change of cable angle to modify the flight control parameters of the aircraft.

In one embodiment of the invention, a load supported from a helicopter is stabilized by modifying the inner control loop of the automatic flight control system of the helicopter by adding thereto the rate of change of cable angle and the lag, or washed out integral, of the rate of change of the angle of the cable with respect to vertical.

The present invention provides correct anti-pendular corrective motions to an aircraft. The invention may be embodied utilizing technology readily available in existing flight control systems, and is easily appended to existing helicopter automatic flight control systems. The invention is relatively inexpensive to provide, and renders the utilization of heavy lift helicopters practicable in a wide variety of operations, such as crane type operations, under extended conditions of flight.

The foregoing and other objects, features and advantages of the present invention will become more apparent in the light of the following detailed description of a preferred embodiment thereof as illustrated in the accompanying drawing.

DESCRIPTION OF THE PREFERRED EMBODIMENT

Figure 1:
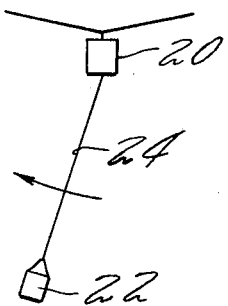
FIG. 1 is a simplified front elevation view of a helicopter supporting a load swinging in pendular motion to starboard.
Figure 2:
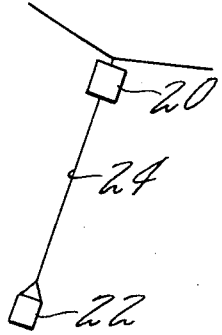
FIG. 2 is a simplified front elevation view of a helicopter rolled to port to overcome or correct the situation of FIG. 1.
Figure 3:
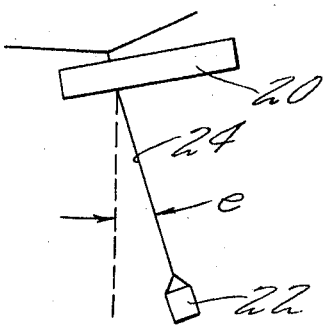
FIG. 3 is a simplified side elevation view of a helicopter in forward flight illustrating a lag of the load behind the helicopter in steady state forward flight condition.

Referring now to FIG. 1 a helicopter 20 supports a load 22 by means of a support cable 24 suspended below the helicopter. As seen in FIG. 1, the helicopter 20 is substantially horizontal and may be assumed to be in straight line flight (toward the viewer) or hovering. However, the load 22 is exhibiting pendular motion, and at the moment is moving to starboard of the helicopter 20. In accordance with one aspect of the present invention, it has been found that the proper way to correct for pendular motion is to first fly the helicopter 20 to starboard so as to attempt to fly in the same direction as the motion of the load, and then, as is illustrated in FIG. 2, to tilt the helicopter 20 in a direction to cause it to move away from the load. As described in more detail with respect to FIG. 3 hereinafter, this motion, generally opposite to the simple harmonic motion of the load, is adjusted by utilizing the rate of change of the angle between the support cable 24 and the vertical, and the lag of that rate, in such a fashion as to cause corrective motion of the aircraft to damp out pendular motion of the load with respect thereto. As an example, consider the case where the aircraft is hovering and there is a gust of wind which blows the load 22 to the starboard as shown in FIG. 1. Subject to the inertia of the load, the rate of change of the angle of the cable 24 with respect to the vertical becomes high initially, then, in accordance with the physics of simple harmonic motion, the load tends to reach its maximum position at which the rate is zero. Initially, when the rate is very high, this is utilized as a signal of polarity to cause the helicopter to initially move to starboard to tend to stay over the load; but as the rate decreases, and the angle increases, eventually they cancel each other and then the angle becomes more of a factor as the rate of change of the angle approaches zero. The net polarity then reverses so as to tilt the aircraft as illustrated in FIG. 2 to tend to pull the load in a direction opposite to the manner in which the load is swinging in simple harmonic motion; in other words as seen in FIG. 2 the motion of the aircraft tends to damp the kinetic energy of the load. By using a lag filter, however, in the steady state (after an interval equal to several time constants of the lag filter involved) it is possible for the load to hang at a steady non-zero angle with respect to the vertical, as illustrated in FIG. 3, with no steady state control signal. This is necessary since, in straight line flight, with or without acceleration, the load will lag behind the aircraft as illustrated in FIG. 3, due to aerodynamic drag forces. A similar condition appertains while executing a turn since it is necessary to overcome aerodynamic drag, centrifugal force necessary to accelerate in the turn, and lag of the load behind the aircraft. All of these functions are accommodated in one embodiment of the invention as illustrated in FIG. 4.

Figure 4:
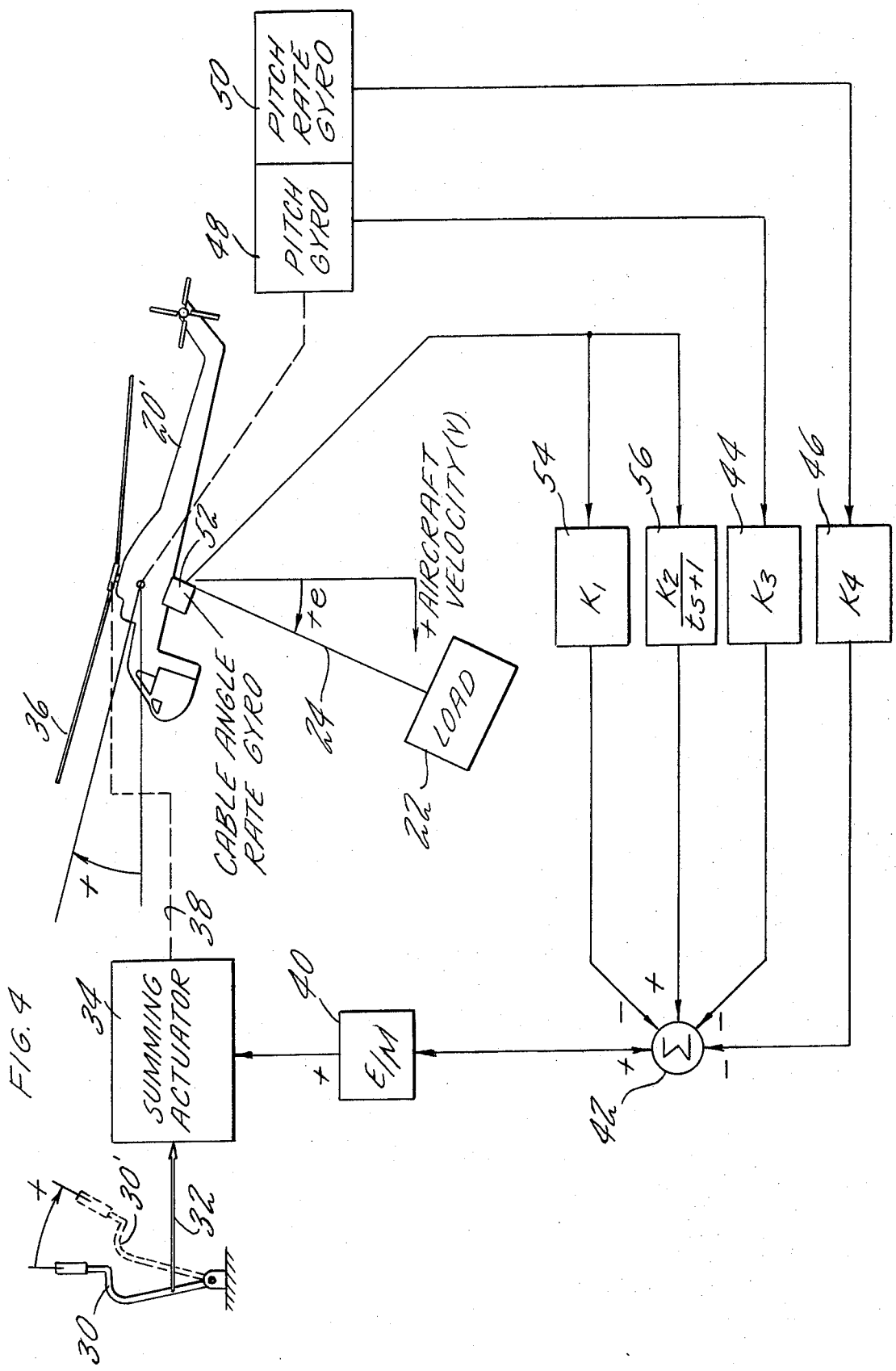
FIG. 4 is a simplified, illustrative schematic block diagram of the longitudinal (or pitch) cyclic pitch control channel in accordance with the present invention.

In FIG. 4, the aircraft itself has an inertial body 20' and is shown separate from the various blocks of the longitudinal (or pitch) cyclic pitch control channel for illustrative purposes. As is known, the pilot operates a combined lateral (roll) and longitudinal cyclic pitch control stick 30 which is mechanically coupled (32) to a mechanical summing actuator 34 which controls the cyclic pitch of the blades 36 of the main rotor of the helicopter 20. As is known, motion of the stick 30 from the position shown in solid lines to the position 30' shown in dotted lines would cause the aircraft to pitch in an upwardly direction, climb, and decelerate in forward flight. The actual mechanical motion at the output 38 of the summing actuator 34 is modified from the mechanical motion of the input 32 by a mechanical input to the summing actuator 34 from an electromechanical actuator 40. The electromechanical actuator 40 derives an input from a summing network 42 which in turn is responsive to a pair of amplifiers 44, 46 having gains of $K_3$ and $K_4$, respectively. The amplifiers 44, 46 are in turn responsive to a pitch gyro 48 and pitch rate gyro 50, respectively. The apparatus 40-50 just described comprises the normal automatic flight control system (AFCS) of the aircraft, which is sometimes referred to as the inner control loop of the aircraft since the functions thereof do not affect the motion of the stick itself, but merely modify the results of stick motion.

In FIG. 4, a sign convention is defined that an upward pitch as shown is taken as a positive pitch angle and it is assumed that, as a result of such positive pitch, the output of the pitch gyro 48 and the output of the pitch rate gyro 50 will both be of such a polarity as applied to the summing network 42 and electromechanic actuator 40 to counteract the positive pitch of the aircraft. Thus, these are shown as negative inputs to the summing network 42.

Figure 5:
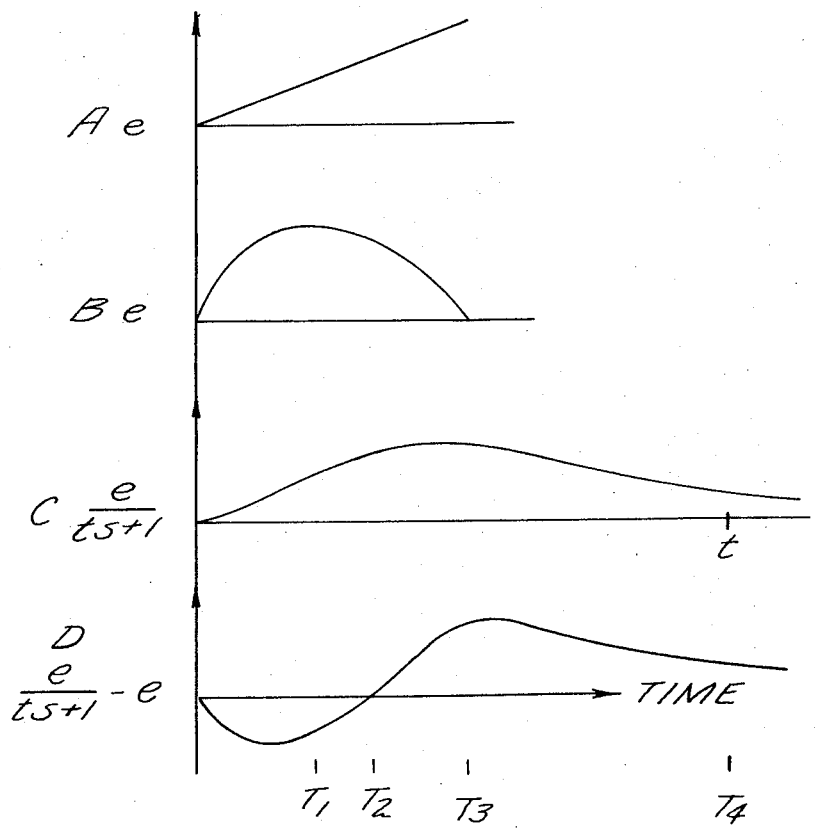
FIG. 5 is a simplified chart illustrating time histories of the LaPlacian functions utilized in the embodiment of FIG. 4.

In accordance with the present invention, the control system of the aircraft is modified so as to stabilize the load 22 in such a fashion as to tend to maintain the cable 24 vertical (though not necessarily perpendicular to the frame of reference of the aircraft). According to the invention, a cable angle rate gyro 52 is mounted on the aircraft in such a fashion that it measures only the rate of change ($de/dt$) of the angle $e$ of the cable with respect to the vertical in a fore-aft plane, and not with respect to the attitude of the aircraft, nor side-to-side. The output of the cable angle rate gyro 52 is applied to an amplifier 54 with a gain of $K_1$, the output of which is applied to the summing network 42. The output of the cable angle rate gyro 52 is also applied to a lag circuit 56 having a function $K_2/(ts+1)$, where $K_2$ is the amplification factor, $t$ is the time constant, and $s$ is the LaPlacian operator (equivalent to the time derivative). The time constant, $t$, is chosen such that the function of the circuit 56 on a short term basis is equivalent to the angle $e$. It is to be noted that the polarity of the amplifier 54 as applied to the summing network 52 is negative (the same as the gyros 48, 50) so that, as the load begins to swing and the rate of change of the angle $e$ with respect to time ($e$) is high, the aircraft initially receives an input of the opposite sense (causing it to pitch down) so the aircraft would fly forward in the convention of FIG. 4 and thus attempt to stay over the load momentarily. However, after a short period of time, the output of amplifier 56 begins to build up, as the output of the amplifier 54 decreases. Since the amplifier 56 is applied to the summing network in the positive sense, it tends to overcome the output of the amplifier 54, and eventually causes a positive pitch of the aircraft so that the aircraft would tend to decelerate, thereby applying an opposite, backward acceleration on the load 22 through the cable 24, to tend to dampen the pendular motion of the load. To illustrate this combined action, FIG. 5 shows just a portion of a swing of the load from vertical, forwardly, to the point as shown in FIG. 4. This example is for a response of the load to a short wind gust, tending to swing the load forward. The operation of the two amplifiers 54, 56 in response to the cable angle rate gyro is illustrated roughly therein, although not to any particular scale. As seen in FIG. 5, illustration A shows the case where the cable angle builds up from zero (vertical) to a value plus e (as shown in FIG. 4) at time $T_3$. In this case the time constant, $t$, is taken to be relatively long with respect to a short term oscillation (short term in this case being equivalent to $T_3$). Illustration B shows that the rate of change of the angle, $e$, builds up from zero to some maximum at about $T_1$, and then decreases to zero at time $T_3$. On the other hand, illustration C shows that the lag function, $e/(ts+1)$, is, in the short term, essentially equal to the angle e (dependent upon the amplification factor $K_2$) so that it maximizes somewhere near time $T_3$, and once the rate of change of angle goes to zero (at time $T_3$) it then decays back toward zero. The combination of the two (which is the effect that the outputs of both amplifiers 54, 56 have at the summing network 42) is shown in illustration D. This is the control input which is applied to the aircraft to overcome the effect of the pendular action of the load. Initially, it supplies a negative input which tends to cause the aircraft to fly over the load, then applies no input at time $T_2$, and then applies a positive input which causes the aircraft to decelerate (as seen in FIG. 4), thereby acting against the swinging of the load so that during the period of time between $T_2$ and $T_3$ it is causing the aircraft to pull against the swinging of the load thereby dissipating the kinetic energy or dampening the harmonic motion of the load. It continues to pull against the load tending to pull the load back under the aircraft from time $T_3$ onwardly, in the simple case illustrated herein. Of course, in the real situation, the waveforms of FIG. 5 become complicated since the rate of change of angle will go negative after time $T_3$ as the load commences to swing back aft. This is further complicated by the fact that the aircraft itself is in motion and has not only the inputs tending to stabilize the load but other inputs of the AFCS, and perhaps from the pilot. It is for this reason that only the simple portion of the cycle has been shown in FIG. 5.

The lateral (or roll) cyclic pitch control channel for a helicopter in accordance with an embodiment of the present invention is identical to the longitudinal (or pitch) control channel illustrated in FIG. 4, with the exception of the fact that the constants are chosen differently since the aircraft response is different in pitch and in roll, and the time constant might be slightly less since the aircraft can respond in roll more rapidly than it can in pitch. A similar sign convention is achieved simply by defining motion of the stick to starboard to be positive; tilting of the aircraft downward on the starboard side to be positive; and a cable angle which is to port of vertical to be positive. In the lateral controls, a cable angle sensor responsive only to rate of change of angle of the cable 24 from vertical in a port-starboard plane provides the necessary rate signal.

As is known, the time constants of the amplifiers, the amplification factors and the polarity of inputs are chosen so as to suit the dynamics of any given implementation of the present invention. For instance, a stabilization analysis of a given aircraft with a typical design load and a given cable length wil result in one set of parameters, and variation of either the dynamics of the aircraft, or the length of the cable, or a substantial variation in the size of the load will alter the parameters required for a stable system, possibly including even the sign or sense of the signals from the amplifiers 54, 56. As an example, a very short cable may require that polarity of the output of either amplifier 54, 56 be reversed in the sign convention of FIG. 4. It is important to note that the choice of parameters including sign can be determined from the standard stability analysis which is well known to the art.

The embodiment of the invention described herein is related to a heavy lift helicopter. However, it should be obvious that other aircraft may be employed in a system incorporating the present invention. Although both pitch and pitch rate gyros are shown, the invention may be practiced utilizing only a pitch gyro and taking the derivative therefrom for the gyro rate function. Similarly, if desired, cable angle may be sensed with position sensors (such as potentiometers) and the rate thereof provided by differentiating the output of the position sensor. The invention may be embodied in other aircraft control systems: for instance, a more complete aircraft control system may include lateral and longitudinal accelerometers to assist in positioning the aircraft in a stable fashion, or may include a ground speed input to facilitate accurate maneuvering of the aircraft.

Thus, although the invention has been shown and described with respect to a preferred embodiment thereof, it should be understood by those skilled in the art that the foregoing and various other changes and omissions in the form and detail thereof may be made therein without departing from the spirit and the scope of the invention.

Having thus described a typical embodiment of our invention, that which we claim as new and desire to secure by Letters Patent of the United States is:

1. Aircraft control system apparatus for stabilizing, against pendular motion, a load suspended beneath the aircraft on a cable exhibiting pendular motion having a basic period including first intervals substantially characterized by relatively high velocity and relatively small angle with respect to the vertical, and including second intervals substantially characterized by relatively low velocity and relatively large angle with respect to the vertical, comprising:

means for sensing motion of said cable with respect to vertical and for generating a manifestation as a function of said motion; and means including first means responsive to said manifestation to cause said aircraft to move in a direction the same as the motion of the load during a substantial portion of said first intervals and including second means also responsive to said manifestation to cause said aircraft to move in a direction opposite to the motion of the load during a substantial portion of said second intervals.

2. Apparatus according to claim 1 wherein said manifestation generating means comprises:

means responsive to changes in the position of said cable with respect to vertical to generate a rate signal indication of the rate of change of the angle of said cable with respect to vertical; and means responsive to said rate signal to generate said manifestation as the difference between the lag of said rate and said rate.

3. A system for stablizing a load suspended beneath an aircraft having a plurality of control surfaces for controlling the attitude and motion thereof, and including a flight control system for providing at least partial control over said control surfaces, comprising:
- a load support cable adapted to extend downwardly beneath said aircraft and to support a load thereon;
- means responsive to changes in the position of said cable with respect to vertical to generate a rate signal indication of the rate of change of the angle of said cable with respect to vertical; and
- means responsive to said rate signal indication to provide a signal manifestation input to said flight control system which is dependent upon said rate and an additional function of said rate in a manner to cause motion of said aircraft so as to counteract pendular motion of said load therebeneath.

4. A system according to claim 3 wherein said additional function is proportional to the lag of said rate.

5. The system according to claim 3 wherein said additional function is proportional to the washed out integral of said rate.

6. The system according to claim 3 wherein said additional function is provided by a lag filter having a transfer characteristic proportional to $1/(ts+1)$ where s is the LaPlacian operator and t is the time constant.

* * * * *